US012424363B2

(12) United States Patent
Yang et al.

(10) Patent No.: US 12,424,363 B2
(45) Date of Patent: Sep. 23, 2025

(54) MAGNETIC THIN FILM LAMINATED STRUCTURE AND MICRO-INDUCTIVE DEVICE THEREOF

(71) Applicant: BEIJING NAURA MICROELECTRONICS EQUIPMENT CO., LTD., Beijing (CN)

(72) Inventors: Yujie Yang, Beijing (CN); Peijun Ding, Beijing (CN); Tongwen Zhang, Beijing (CN); Wei Xia, Beijing (CN); Hougong Wang, Beijing (CN)

(73) Assignee: BEIJING NAURA MICROELECTRONICS EQUIPMENT CO., LTD., Beijing (CN)

( * ) Notice: Subject to any disclaimer, the term of this patent is extended or adjusted under 35 U.S.C. 154(b) by 62 days.

(21) Appl. No.: 18/324,705

(22) Filed: May 26, 2023

(65) Prior Publication Data

US 2023/0298789 A1 Sep. 21, 2023

Related U.S. Application Data

(60) Division of application No. 16/386,750, filed on Apr. 17, 2019, now Pat. No. 11,699,541, which is a
(Continued)

(30) Foreign Application Priority Data

Oct. 31, 2016 (CN) ........................ 201610929057.9

(51) Int. Cl.
*H01F 3/02* (2006.01)
*H01F 10/14* (2006.01)
(Continued)

(52) U.S. Cl.
CPC ............... *H01F 3/02* (2013.01); *H01F 10/30* (2013.01); *H01F 17/04* (2013.01); *H01F 27/263* (2013.01);
(Continued)

(58) Field of Classification Search
CPC .......... H01F 10/14; H01F 10/30; H01F 17/04; H01F 27/263; H01F 3/02; H01F 41/0206; H01F 41/14; H01F 41/18; H01F 41/32
See application file for complete search history.

(56) References Cited

U.S. PATENT DOCUMENTS 4,608,297 A 8/1986 Shimada et al.
4,687,712 A 8/1987 Sugita et al.
(Continued)

FOREIGN PATENT DOCUMENTS

CN 101207066 A 6/2008
CN 101260514 A 9/2008
(Continued)

OTHER PUBLICATIONS

Japan Patent Office Decision of Refusal for Japanese Patent Application No. 2019-522894 Nov. 6, 2020 6 pages (with translation).
(Continued)

*Primary Examiner* — Minh N Trinh
(74) *Attorney, Agent, or Firm* — ANOVA LAW GROUP, PLLC

(57) ABSTRACT

A magnetic thin film laminated structure includes a first layer structure and a second layer structure stacked on the first layer structure. The first layer structure includes an adhesive layer on a substance, the adhesive layer being made of a material having compressive stress, at least one pair of layers on the adhesive layer, each pair of the at least one pair of layers including a magnetic film layer and an isolation layer, and an additional magnetic film layer on the at least
(Continued)

one pair of layers. The second layer structure includes another adhesive layer on the first layer structure, another at least one pair of layers on the another adhesive layer, each pair of the another at least one pair of layers including a magnetic film layer and an isolation layer, and another additional magnetic film layer on the another at least one pair of layers.

20 Claims, 3 Drawing Sheets

Related U.S. Application Data continuation of application No. PCT/CN2017/107630, filed on Oct. 25, 2017.

(51) Int. Cl.

| | |
|---|---|
| ***H01F 10/30*** | (2006.01) |
| ***H01F 17/04*** | (2006.01) |
| ***H01F 27/26*** | (2006.01) |
| ***H01F 41/02*** | (2006.01) |
| ***H01F 41/14*** | (2006.01) |
| ***H01F 41/18*** | (2006.01) |
| ***H01F 41/32*** | (2006.01) |

(52) U.S. Cl.

CPC ......... *H01F 41/0206* (2013.01); *H01F 41/14* (2013.01); *H01F 41/18* (2013.01); *H01F 41/32* (2013.01); *H01F 10/14* (2013.01)

(56) References Cited

U.S. PATENT DOCUMENTS

| | | | | |
|---|---|---|---|---|
| 5,328,523 | A | 7/1994 | Fontaine | |
| 8,323,728 | B2 | 12/2012 | Iorio et al. | |
| 11,699,541 | B2 * | 7/2023 | Yang | H01F 41/14 336/84 M |
| 2004/0219328 | A1 | 11/2004 | Tasaki et al. | |
| 2012/0236528 | A1 | 9/2012 | Le et al. | |
| 2014/0216939 | A1 | 8/2014 | Fontana, Jr. et al. | |
| 2015/0187375 | A1 | 7/2015 | Zhang et al. | |
| 2023/0298789 | A1 * | 9/2023 | Yang | H01F 27/263 336/84 M |

FOREIGN PATENT DOCUMENTS

| | | | |
|---|---|---|---|
| CN | 101285170 | A | 10/2008 |
| CN | 101391497 | A | 3/2009 |
| CN | 102623434 | A | 8/2012 |
| CN | 103918024 | A | 7/2014 |
| CN | 103918042 | A | 7/2014 |
| CN | 103929933 | A | 7/2014 |
| CN | 105449096 | A | 3/2016 |
| JP | S61180914 | A | 8/1986 |
| JP | H0282601 | A | 3/1990 |
| JP | H03112106 | A | 5/1991 |
| JP | 103278409 | A | 12/1991 |
| JP | H03278409 | A | 12/1991 |
| JP | H042181 | A | 1/1992 |
| JP | H09293207 | A | 11/1997 |
| JP | 2003017320 | A | 1/2003 |
| JP | 2007251111 | A | 9/2007 |
| JP | 2010044842 | A | 2/2010 |
| JP | 2011154746 | A | 8/2011 |
| TW | 201204231 | A1 | 1/2012 |
| TW | 201229919 | A | 7/2012 |

OTHER PUBLICATIONS

Japan Patent Office Decision to Grant a Patent for Japanese Patent Application No. 2019-522894 May 26, 2021 6 pages (with translation).

The World Intellectual Property Organization (WIPO) International Search Report for PCT/CN2017/107630 Jan. 31, 2018 6 Pages.

* cited by examiner

MAGNETIC THIN FILM LAMINATED STRUCTURE AND MICRO-INDUCTIVE DEVICE THEREOF

CROSS-REFERENCE TO RELATED APPLICATION

This application is a divisional application of U.S. application Ser. No. 16/386,750, filed on Apr. 17, 2019, which is a continuation application of International Application No. PCT/CN2017/107630, filed on Oct. 25, 2017, which claims priority of Chinese Patent Application NO. 201610929057.9, filed on Oct. 31, 2016. The above enumerated patent applications are incorporated herein by reference.

TECHNICAL FIELD

The present disclosure relates to the field of microelectronics and, in particular, to a magnetic thin film laminated structure, and a micro-inductive device.

BACKGROUND

With the development of science and technology, the integrated circuit manufacturing process can significantly reduce the size of a processor, but some core components such as integrated inductors, noise suppressors, etc., still face many difficulties in terms of high frequency, miniaturization, and integration. In order to solve this problem, soft magnetic thin film materials having high magnetization, high magnetic permeability, high resonance frequency, and high electrical resistivity have attracted more and more attention.

SUMMARY

In accordance with the disclosure, one aspect of the present disclosure provides a magnetic thin film laminated structure. The magnetic thin film laminated structure includes a first layer structure that includes an adhesive layer deposited on a substance, the adhesive layer being made of a material having compressive stress and comprising a Ta film, a TaN film, or a TiN film, at least one pair of layers deposited on the adhesive layer, each pair of the at least one pair of layers including a magnetic film layer and an isolation layer, and an additional magnetic film layer deposited on the at least one pair of layers. A second layer structure is stacked on the first layer structure and includes another adhesive layer deposited on the first layer structure, the another adhesive layer being made of a material having compressive stress and comprising a Ta film, a TaN film, or a TiN film, another at least one pair of layers deposited on the another adhesive layer, each pair of the another at least one pair of layers including a magnetic film layer and an isolation layer, and another additional magnetic film layer deposited on the another at least one pair of layers.

In accordance with the disclosure, another aspect of the present disclosure provides a micro-inductive device. The micro-inductive device includes a magnetic core fabricated by a magnetic thin film laminated structure. The magnetic thin film laminated structure includes a first layer structure that includes an adhesive layer deposited on a substance, the adhesive layer being made of a material having compressive stress and comprising a Ta film, a TaN film, or a TiN film, at least one pair of layers deposited on the adhesive layer, each pair of the at least one pair of layers including a magnetic film layer and an isolation layer, and an additional magnetic film layer deposited on the at least one pair of layers. A second layer structure is stacked on the first layer structure and includes another adhesive layer deposited on the first layer structure, the another adhesive layer being made of a material having compressive stress and comprising a Ta film, a TaN film, or a TiN film, another at least one pair of layers deposited on the another adhesive layer, each pair of the another at least one pair of layers including a magnetic film layer and an isolation layer, and another additional magnetic film layer deposited on the another at least one pair of layers.

In the deposition method of the magnetic thin film laminated structure provided by the present disclosure, the magnetic/isolation unit is deposited on the adhesion layer, and the adhesion layer can adjust the tensile stress of the magnetic thin film laminated structure caused by the tensile stress of the magnetic film layer to avoid a phenomenon that tensile stress of the magnetic thin film laminated structure is too big, thereby making it possible to obtain a magnetic thin film laminated structure having a large total thickness, broadening the application frequency range of the inductive device fabricated therefrom; and, in addition, due to the stress adjustment effect of the adhesive layer on the magnetic thin film laminated structure, a large-thickness magnetic laminated film structure can be fabricated on the workpiece to be processed, thereby avoiding cracking and shedding.

The magnetic thin film laminated structure provided by the embodiment of the present disclosure has a magnetic/isolation unit deposited on the adhesive layer, and the adhesive layer can adjust the tensile stress of the magnetic film layer to further adjust the tensile stress of the magnetic thin film laminated structure. As such, the total thickness of the magnetic thin film laminated structure can be increased, thereby broadening the application frequency range of the inductor device fabricated therefrom.

The present disclosure also provides a micro-inductive device including a magnetic core fabricated by the above-mentioned magnetic thin film laminated structure provided by the present disclosure. The total thickness of the magnetic thin film laminated structure is increased, which broadens the application frequency range of the inductive device. For example, the application frequency of the micro-inductive device can range from 100 MHz to 5 GHz.

DETAILED DESCRIPTION

In order to enable those skilled in the art to better understand the technical solutions of the present disclosure, a deposition method of a magnetic thin film laminated structure, a magnetic thin film laminated structure and a micro-inductive device provided by the present disclosure are described in detail below with reference to the accompanying drawings.

Figure 1:
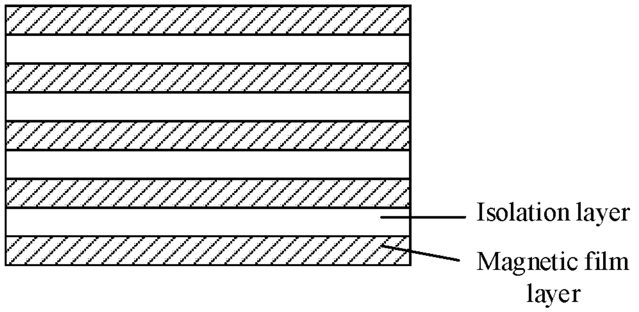
FIG. 1 is a structural view of a conventional magnetic thin film laminated structure.

FIG. 1 is a structural view showing a conventional magnetic thin film laminated structure. As shown in FIG. 1, the magnetic thin film laminated structure is formed by alternately providing an isolation layer and a magnetic film layer, where the isolation layer is directly deposited on a workpiece to be processed.

However, in the above magnetic thin film laminated structure, because the magnetic film layer has a large tensile stress and is brittle, it is not easy to fabric a thick magnetic thin film laminated structure obtained from the magnetic film layer. If the total thickness of the above-fabricated magnetic thin film laminated structure is more than 500 nm, due to the large tensile stress and brittleness of the magnetic film layer, the tensile stress of the magnetic thin film laminated structure is correspondingly large. Thus, the above-mentioned magnetic thin film laminated structure may encounter a phenomenon of detaching (or cracked detaching) from the attached workpiece, and hence is not suitable for the fabrication of a micro-inductive device. In addition, because it is not easy to fabric a thick above-mentioned magnetic thin film laminated structure, an applied frequency range of an inductor device obtained thereby is usually only 1 to 5 GHz, and cannot cover a frequency range of MHz.

Aiming to at least solve one of the technical problems existing in the existing technology, the present disclosure provides a deposition method of a magnetic thin film laminated structure, a magnetic thin film laminated structure, and a micro-inductive device. The deposition method of the magnetic thin film laminated structure can increase a total thickness of the magnetic thin film laminated structure, broaden the application frequency range of the inductor device fabricated by the same, and can be applied to a large-sized workpiece to fabricate the micro-inductance device.

Figure 2:
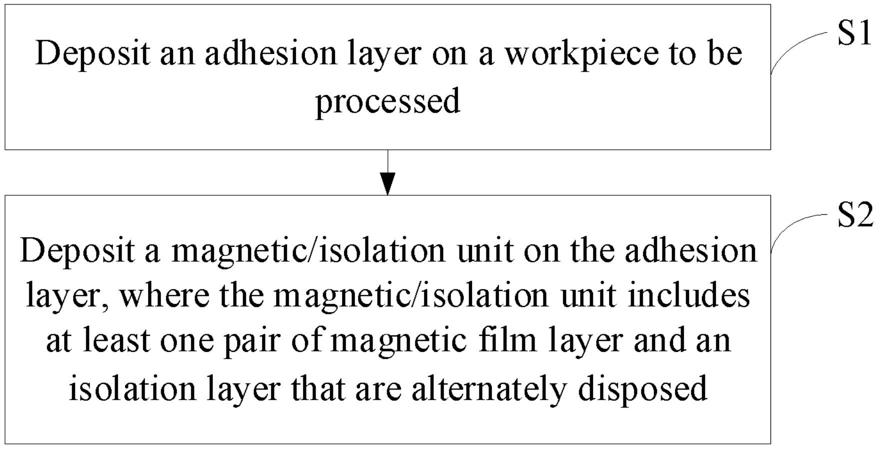
FIG. 2 is a flow chart of a deposition method of a magnetic thin film laminated structure according to a first embodiment of the present disclosure.
Figure 3:
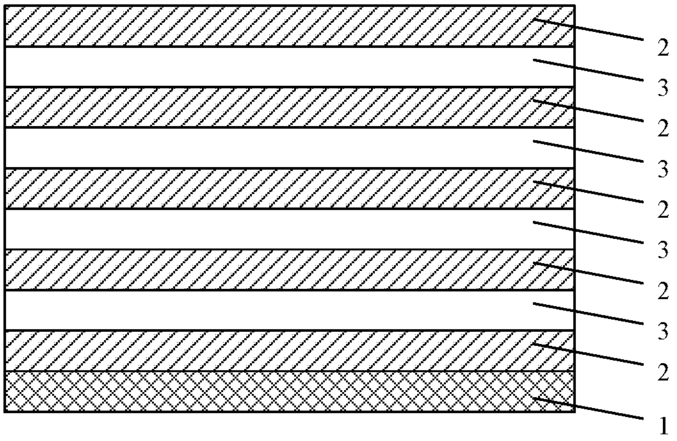
FIG. 3 is a structural view showing a magnetic thin film laminated structure obtained by a deposition method of a magnetic thin film laminated structure according to a first embodiment of the present disclosure.

FIG. 2 is a flow chart of a deposition method of a magnetic thin film laminated structure according to a first embodiment of the present disclosure. FIG. 3 is a structural view showing a magnetic thin film laminated structure obtained by a deposition method of a magnetic thin film laminated structure according to a first embodiment of the present disclosure. Referring to FIG. 2 and FIG. 3 together, the deposition method of the magnetic thin film laminated structure includes the following steps.

At S1, an adhesive layer 1 is deposited on a workpiece to be processed.

It should be noted that, in S1 of the embodiment of the present disclosure, the workpiece to be processed includes a workpiece to be processed of which a surface is not deposited with a film, and a workpiece to be processed of which a surface is deposited with a magnetic film layer 2 or an isolating layer 3.

At S2, a magnetic/isolation unit is deposited on the adhesion layer 1, where the magnetic/isolation unit includes at least one pair of magnetic film layer 2 and the isolation layer 3 that are alternately arranged. The so-called alternating arrangement means alternately laminating layers along an axial direction of the workpiece to be processed.

A layer in contact with the adhesion layer 1 in the magnetic/isolation unit is the magnetic film layer 2, and accordingly, the isolation layer 3 is deposited on the magnetic film layer 2.

The isolation layer 3 is made of a non-magnetic material, and the non-magnetic material includes Cu, Ta, $SiO_2$ or $TiO_2$. The isolation layer 3 can not only isolate the adjacent two magnetic film layers 2 and reduce the magnetic flux skin effect, and can also play a role to adjust the resistivity of the magnetic thin film laminated structure, reduce the eddy current loss, and improve a high-frequency performance of the magnetic thin film laminated structure. It is easy to understand that in order to enable the isolation layer 3 to fully play the above role, the magnetic film layer 2 may be deposited on the adhesion layer 1, and then the isolation layer 3 is deposited on the magnetic film layer 2, so that the magnetic film layer 2 and the isolation layer 3 are alternately disposed. Further, the topmost layer is the isolation layer 3, which can further increase the electrical resistivity of the magnetic thin film laminated structure.

In some embodiments, the deposition method of the magnetic thin film laminated structure provided by the present disclosure may further includes the following S3.

At S3, a magnetic film layer 2 is deposited on the magnetic/isolation unit.

In the present embodiment, there are four pairs of the magnetic film layer 2 and the isolation layer 3, and a magnetic film layer 2 is further deposited on the uppermost isolation layer 3. That is, there are a total number of five layers of the magnetic film layer 2; a total number of four layers of the isolation layer 3. Of course, in practical applications, S3 may be omitted, that is, the total number of layers of the magnetic film layer 2 is equal to that of the isolation layer 3.

With the help of the above-mentioned adhesive layer 1, the excessive tensile stress of the magnetic thin film laminated structure caused by the tensile stress of the magnetic film layer 2 can be avoided. As such, a magnetic thin film laminated structure having a large total thickness can be obtained, thereby broadening the applicable frequency range of the fabricated inductive device.

The adhesion layer 1 can be made of a material having compressive stress, such as a Ta film, a TaN film, or a TiN film, so as to play a role to adjust the tensile stress of the magnetic thin film laminated structure.

For the magnetic thin film laminated structure, the performance of the magnetic thin film laminated structure is determined by the magnetic film layer 2 and the insulating layer 3 together. The magnetic film layer 2 forms a micro-inductive magnetic core to increase the magnetic flux. The isolation layer 3 plays a role to isolate the adjacent two magnetic film layers 2, and adjusts the resistivity of the magnetic film layer 2, reduces eddy current loss, and improves high frequency performance. In some embodiments, by depositing a magnetic film layer 2 on the magnetic/isolation unit at S3, the overall thickness of the magnetic film layer 2 in the magnetic thin film laminated structure can be further increased, thereby increasing magnetic properties. Therefore, in practical applications, the magnetic properties of the desired magnetic thin film laminated structure can be matched.

The deposition method of the adhesion layer 1 is described in detail below.

In some embodiments, at S1, the adhesion layer 1 is deposited using a sputtering process. The apparatus for performing the sputtering process mainly includes a reaction chamber, a target, a base for carrying the substrate, and a pulsed DC power source, where the target is disposed at the top of the reaction chamber, and the base is disposed in the reaction chamber and located below the target. In some embodiments, the vertical spacing between the target and the base (i.e., the target spacing) can be 30 to 90 mm. Moreover, the target is electrically connected to the pulsed DC power source for applying sputtering power to the target, so as to excite the process gas in the reaction chamber to form a plasma, bombard the target to sputter a target material and deposit it on the surface of the wafer and form a film. Due to the limited temperature range of a photoresist used in the process, in the process integration, it is easier to control the temperature of the wafer and the photoresist thereon by using lower sputtering power. The target is electrically connected to the pulsed DC power source, so that the adhesion layer 1 having a superior stress adjustment effect can be obtained at the lower sputtering power.

The parameters of the above sputtering process are as follows: the sputtering power output by the pulsed DC power source is lower than or equal to 15 kw; and the process pressure of the sputtering process is lower than or equal to 5 mTorr. In some embodiments, in order to meet the process integration requirements and improve the process effect, the sputtering power output by the pulsed DC power source ranges from 3 to 10 kw. The process pressure of the sputtering process ranges from 0.5 to 2 mTorr. The thickness of the sputtering ranges from 80 to 200 nm.

In some embodiments, at S1, the target may also be electrically connected to a radio frequency power source, and the sputtering power output by the radio frequency power source is lower than or equal to 3 kw; or the target may be electrically connected to the DC power source, and the sputtering power output by the DC power source is lower than or equal to 20 kW. In some embodiments, in order to meet the process integration requirements and improve the process effect, the sputtering power output by the RF power source ranges from 0.3 to 1.5 kW. Alternatively, the sputtering power output by the DC power source ranges from 15 to 19 kW.

In some embodiments, at S2, the magnetic film layer 2 may be deposited using a sputtering process. The apparatus for performing the sputtering process mainly includes a reaction chamber, a target, a base for carrying the substrate, a sputtering power source, and a bias magnetic field device, where the target is disposed at the top of the reaction chamber, and the base is disposed in the reaction chamber and is located below the target. The target is electrically connected to the sputtering power source, and the sputtering power source is used to apply sputtering power to the target to excite the process gas in the reaction chamber to form a plasma and bombard the target to sputter a target material out of the target and deposited on the surface of the adhesive layer 1, thereby forming the magnetic film layer 2.

In addition, the bias magnetic field device is disposed in the reaction chamber and includes two sets of magnets of opposite polarities. The two sets of magnet sets are respectively disposed on opposite sides of the base. The bias magnetic field device can form a horizontal magnetic field (parallel to the surface of the wafer) in a region close to the base in the reaction chamber, and the magnetic field strength of the horizontal magnetic field can reach 50 to 300 Gs. As such, when the sputtering process is performed, magnetic domains of the magnetic materials deposited on the wafer are arranged in the horizontal direction so that an easy magnetization field can be formed in the magnetic domain arrangement direction, and a hard-magnetic field is formed in a direction perpendicular to the magnetic domain alignment direction. That is, an in-plane anisotropy field is formed, so as to obtain an in-plane anisotropic magnetic thin film laminated structure for fabricating a micro-inductive device.

The parameters of the above sputtering process are as follows: the sputtering power output by the excitation power source is lower than or equal to 2 kw; and the process pressure of the sputtering process is lower than or equal to 5 mTorr. In some embodiments, in order to meet the process integration requirements, optimize the performance of the magnetic film layer, and improve the process effect, the sputtering power output by the excitation power ranges from 0.5 to 1.5 kW; the process pressure of the sputtering process ranges from 0.3 to 3 mTorr.

The magnetic film layer 2 is made of a material having soft magnetic properties. The soft magnetic material satisfies conditions such as high saturation magnetization (Ms), low residual magnetization (Mr), high initial magnetic permeability (μi), and high maximum magnetic permeability ($\mu_{max}$), and small coercivity (Hc). As such, the change in the external magnetic field can be quickly responded, and the high magnetic flux density can be obtained with low loss.

In some embodiments, the soft magnetic material includes a NiFe permalloy material, a CoZrTa amorphous material, a Co-based material, a Fe-based material, or a Ni-based material. Among them, the NiFe permalloy material may be, for example, $Ni_{80}Fe_{20}$, $Ni_{45}Fe_{55}$, $Ni_{81}Fe_{19}$, etc. The CoZrTa amorphous material may be, for example, $Co_{91.5}Zr_{4.0}Ta_{4.5}$, etc. The Co-based material, the Fe-based material, or the Ni-based material may be, for example, $Co_{60}Fe_{40}$, NiFeCr, etc.

In some embodiments, at S2, the isolation layer 3 may be deposited using a sputtering process. The apparatus for performing the sputtering process mainly includes a reaction chamber, a target, a base for carrying the substrate, and a sputtering power source, where the target is disposed at a top of the reaction chamber, and the base is disposed in the reaction chamber and located below the target. Moreover, the target is electrically connected to the sputtering power source.

Parameters of the above sputtering process are as follows: a sputtering power output by the sputtering power output is lower than or equal to 5 kw; and a process pressure of the sputtering process is lower than or equal to 20 mTorr. In some embodiments, in order to meet the process integration requirements and improve the process effect, the sputtering power output by the sputtering power source ranges from 1 to 2 kw; and the process pressure of the sputtering process ranges from 9 to 12 mTorr.

In some embodiments, the thickness of the adhesion layer 1 ranges from 50 to 300 nm. The thickness of the magnetic film layer 2 ranges from 30 to 200 nm. The thickness of the isolation layer 3 ranges from 3 to 10 nm. In some embodiments, the thickness of the adhesion layer 1 ranges from 80 to 200 nm. The thickness of the magnetic film layer 2 ranges from 50 to 150 nm. The thickness of the isolation layer 3 ranges from 5 to 8 nm.

Figure 4:
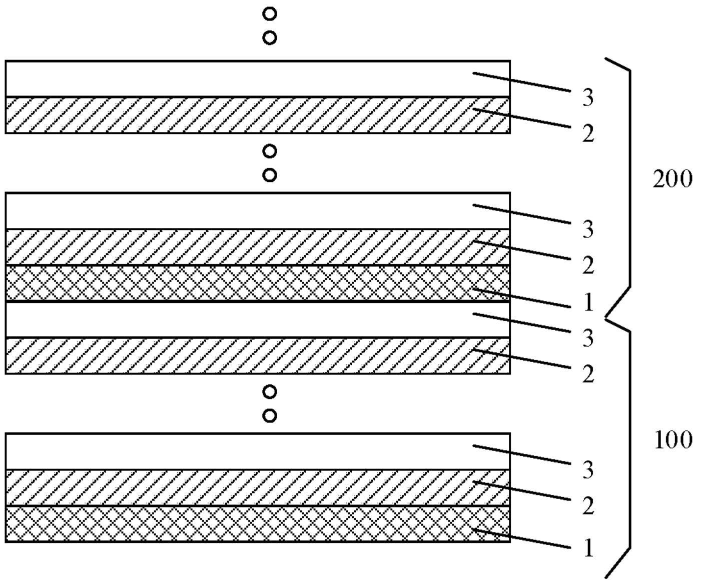
FIG. 4 is a structural view showing a magnetic thin film laminated structure obtained by a deposition method of a magnetic thin film laminated structure according to a second embodiment of the present disclosure.

FIG. 4 is a structural view showing a magnetic thin film laminated structure obtained by a deposition method of a magnetic thin film laminated structure according to a second embodiment of the present disclosure. Referring to FIG. 4, compared to the foregoing first embodiment, the deposition method provided by the embodiment of the present disclosure is different in that S1 and S2 are alternately performed at least twice to obtain a magnetic thin film laminated structure.

In some embodiments, the magnetic thin film laminated structure obtained by the deposition method provided by the embodiment includes M magnetic laminated film units, that is, a first magnetic laminated film unit 100, a second magnetic laminated film unit 200, . . . , a Mth the magnetic laminated film unit, where M is an integer greater than 1. For each of the magnetic laminated film units, an adhesion layer 1 and a magnetic/isolation unit are included. The magnetic/isolation unit includes at least one pair of magnetic film layer 2 and the isolation layer 3 that are alternately arranged. In some embodiments, for each magnetic/isolation unit, the layer that is in contact with the adhesion layer 1 is the magnetic film layer 2, and the isolation layer 3 is disposed on the magnetic film layer 2.

In a scenario that the thickness of the magnetic thin film laminated structure is constant, if the number of pairs of the magnetic film layer 2 and the isolation layer 3 is too large, it indicates that the number of times of fabricating the magnetic film layer 2 and the isolation layer 3 is too large. Therefore, for the entire process equipment system, a total number of profess is large, which causes a large process pressure of the system, so that a productivity of the system per unit time is reduced, resulting in an increase in the production cost of the system. On the other hand, the number of pairs of the magnetic film layer 2 and the isolation layer 3 is too small, the thickness of the single layer of each of the adhesion layer 1, the magnetic film layer 2, and the isolation layer 3 involved in the magnetic thin film laminated structure is large, which causes the performance of the magnetic thin film laminated structure to be impaired. Therefore, for the magnetic thin film laminated structure, it is necessary to comprehensively consider the performance of the system and the performance of the magnetic thin film laminated structure to optimize the total thickness of the magnetic thin film laminated structure and the thickness of each layer, especially to optimize the number of pairs of the insulating layer 3 and the magnetic film layer 2. In some embodiments, the number of pairs of the isolation layer 3 and the magnetic film layer 2 is two to fifty, and the range the number of pairs can satisfy the performance requirements of the magnetic thin film laminated structure and ensure good system productivity.

By adopting multilayer-structured magnetic thin film laminated structure, the total thickness of the magnetic thin film laminated structure can be further increased, thereby broadening the application frequency range of the inductive device fabricated therefrom. In some embodiments, the total thickness of the magnetic thin film laminated structure ranges from 400 to 3000 nm. In some embodiments, the application frequency of the magnetic thin film laminated structure ranges from 100 MHz to 5 GHz.

In the present embodiment, the sputtering thickness of the adhesion layer 1 ranges from 3 to 50 nm. The thicknesses of the magnetic film layer 2 and the isolation layer 3 are the same as that of the first embodiment described above. Further, other process parameters for fabricating the adhesion layer 1, the magnetic film layer 2, and the isolation layer 3 are the same as those of the first embodiment described above.

Further, in the present embodiment, each time S2 is performed, a magnetic/isolation unit is deposited, that is, there is a single-layer magnetic/isolation unit between adjacent two adhesive layers 1. However, the present disclosure is not limited thereto. In practical applications, each time S2 is performed, two or more layers of magnetic/isolation units may be deposited for, that is, there are two or more magnetic/isolated units continuously between adjacent two layers of adhesion layers 1.

It should be noted that, in the present embodiment, each of the magnetic laminated film units includes the adhesion layer 1 and the magnetic/isolation unit. However, the present disclosure is not limited thereto, and in practical applications, each of the magnetic laminated film units includes an adhesion layer 1, a magnetic/isolation unit, and a magnetic film layer 2.

As another technical solution, the present disclosure also provides a magnetic thin film laminated structure including an adhesion layer 1 and a magnetic/isolation unit. The magnetic/isolation unit includes at least one pair of a magnetic film layer 2 and an isolation layer 3 that are alternately arranged.

In some embodiments, the magnetic film layer 2 is located on the adhesion layer, and the isolation layer 3 is located on the magnetic film layer 2.

Alternatively, as shown in FIG. 3, a magnetic film layer 2 is further disposed on the top layer of the magnetic thin film laminated structure (including at least one pair of magnetic film layer 2 and the isolation layer 3 that are alternately disposed).

In some embodiments, as shown in FIG. 4, the magnetic thin film laminated structure includes M magnetic laminated film units, that is, a first magnetic laminated film unit 100, a second magnetic laminated film unit 200, . . . , a Mth the magnetic laminated film unit, where M is an integer greater than 1. For each of the magnetic laminated film units, an adhesion layer 1 and a magnetic/isolation unit are included. The magnetic/isolation unit includes at least one pair of magnetic film layer 2 and the isolation layer 3 that are alternately arranged. Alternatively, the magnetic film layer 2 is located on the adhesion layer, and the isolation layer 3 is located on the magnetic film layer 2. In some embodiments, a number of pairs of the isolation layer 3 and the magnetic film layer 2 is two to fifty. A sputtering thickness of the adhesion layer 1 ranges from 3 to 50 nm.

By adopting the structure of the multilayer magnetic thin film laminated structure, the total thickness of the magnetic thin film laminated structure can be further increased, thereby broadening the range of application frequency of the inductive device fabricated therefrom. In some embodiments, the total thickness of the magnetic thin film laminated structure ranges from 400 to 3000 nm. In some embodiments, the application frequency of the inductive device fabricated by the above magnetic thin film laminated structure ranges from 100 MHz to 5 GHz.

Further, in the present embodiment, a single layer of magnetic/isolation unit is provided between the adjacent two adhesive layers 1. However, the present disclosure is not limited thereto, and in practical applications, two or more magnetic/isolated units that are continuously disposed may be provided between adjacent two adhesive layers 1.

It should be noted that, in the present embodiment, each of the magnetic laminated film units includes the adhesion layer 1 and the magnetic/isolation unit. However, the present disclosure is not limited thereto, and in practical applications, each of the magnetic laminated film units may further include an adhesion layer 1, a magnetic/isolation unit, and a magnetic film layer 2.

In the deposition method of the magnetic thin film laminated structure provided by the present disclosure, the magnetic/isolation unit is deposited on the adhesion layer, and the adhesion layer can adjust the tensile stress of the magnetic thin film laminated structure caused by the tensile stress of the magnetic film layer to avoid a phenomenon that tensile stress of the magnetic thin film laminated structure is too big, thereby making it possible to obtain a magnetic thin film laminated structure having a large total thickness, broadening the application frequency range of the inductive device fabricated therefrom; and, in addition, due to the stress adjustment effect of the adhesive layer on the magnetic thin film laminated structure, a large-thickness magnetic laminated film structure can be fabricated on the workpiece to be processed, thereby avoiding cracking and shedding.

The magnetic thin film laminated structure provided by the embodiment of the present disclosure has a magnetic/isolation unit deposited on the adhesive layer 1, and the adhesive layer 1 can adjust the tensile stress of the magnetic thin film laminated structure caused by the tensile stress of the magnetic film layer 2. The total thickness of the magnetic thin film laminated structure is increased, thereby broadening the application frequency range of the inductor device fabricated therefrom.

As another technical solution, the present disclosure also provides a micro-inductive device including a magnetic core fabricated by the above-mentioned magnetic thin film laminated structure provided by the present disclosure. The total thickness of the magnetic thin film laminated structure in increased, which broadens the application frequency range of the inductive device. For example, the application frequency of the micro-inductive device can range from 100 MHz to 5 GHz.

Figure 5:
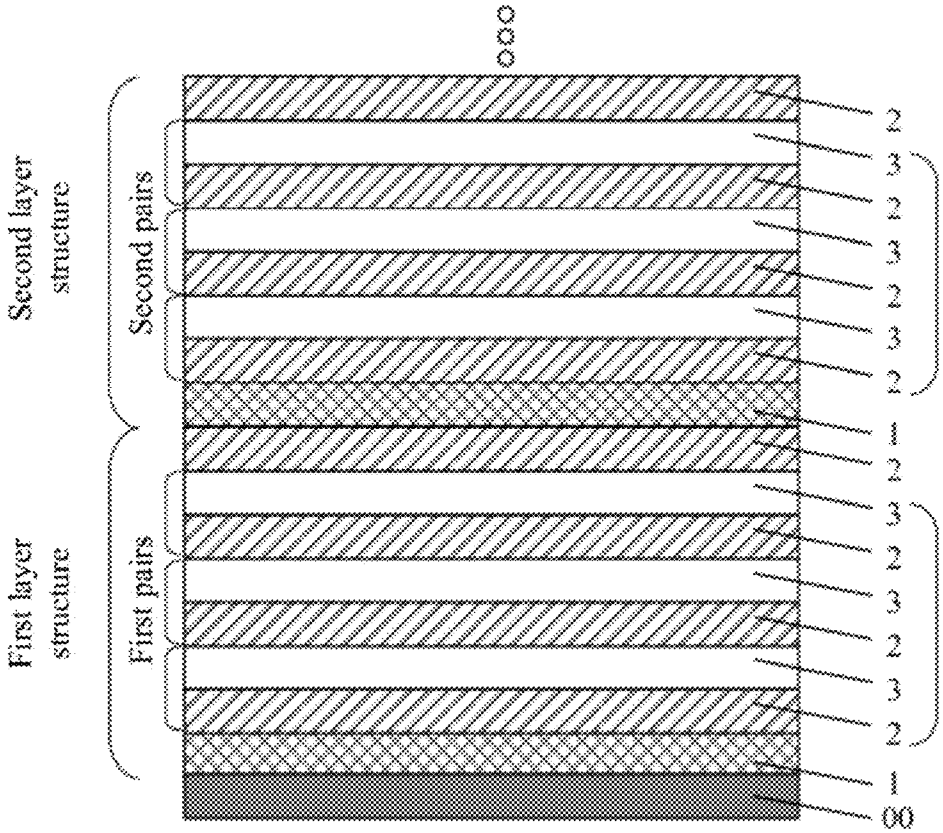
FIG. 5 is a structural view showing another exemplary magnetic thin film laminated structure according to another embodiment of the present disclosure.

In some embodiments, as illustrated in FIG. 5, an exemplary deposition method of a magnetic thin film laminated structure may include: depositing an adhesive layer 1 on a substance 00 that is a workpiece to be processed; depositing at least one pair of layers on the adhesive layer 1, each pair being formed by depositing a magnetic film layer 2 and depositing an isolation layer 3 on the magnetic film layer 2; and depositing an additional one magnetic film layer 2 on the at least one pair of the magnetic film layer 2 and the isolation layer 3. The processes of depositing the adhesive layer 1, depositing the at least one pair of the magnetic film layer 2 and the isolation layer 3, and depositing the additional one magnetic film layer 2 are performed at least twice. The adhesive layer 1 includes a material having compressive stress; and the material having compressive stress comprises a Ta film, a TaN film, or a TiN film. For illustration purposes, FIG. 5 shows three pairs of the magnetic film layer 2 and the isolation layer 3, although any number between two to fifty of the pairs may be included in the disclosed magnetic thin film laminated structure.

As such, various embodiments provide a method of forming a magnetic thin film laminated structure. The magnetic thin film laminated structure may include, for example, a multi-layered structure. Each layer in the multi-layered structure may be the same or different. A first layer structure of the multi-layered structure may be formed by: depositing an adhesive layer on a substance, the adhesive layer being made of a material having compressive stress (e.g., including a Ta film, a TaN film, or a TiN film); depositing at least one pair of layers on the adhesive layer, each pair of the at least one pair of layers including a magnetic film layer and an isolation layer; and depositing an additional magnetic film layer on the at least one pair of layers, such that the first layer structure includes: the adhesive layer, the at least one pair of layers on the adhesive layer, and the additional magnetic film layer on the at least one pair of layers. A second layer structure of the multi-layered structure may be formed by, e.g., repeating the formation of the first layer structure, which includes: depositing another adhesive layer on the first layer structure, the another adhesive layer being made of a material having compressive stress and comprising; depositing another at least one pair of layers on the another adhesive layer, each pair of the another at least one pair of layers including a magnetic film layer and an isolation layer; and depositing another additional magnetic film layer on the another at least one pair of layers, to form the second layer structure stacked on the first layer structure.

Various embodiments further provide a magnetic thin film laminated structure. The magnetic thin film laminated structure may include, for example, a multi-layered structure. Each layer in the multi-layered structure may be the same or different. The magnetic thin film laminated structure may include a first layer structure and a second layer structure stacked on the first layer structure. The first layer structure includes an adhesive layer deposited on a substance, the adhesive layer being made of a material having compressive stress, at least one pair of layers deposited on the adhesive layer, each pair of the at least one pair of layers including a magnetic film layer and an isolation layer, and an additional magnetic film layer deposited on the at least one pair of layers. The second layer structure includes another adhesive layer deposited on the first layer structure, the another adhesive layer being made of a material having compressive stress, another at least one pair of layers deposited on the another adhesive layer, each pair of the another at least one pair of layers including a magnetic film layer and an isolation layer, and another additional magnetic film layer deposited on the another at least one pair of layers.

The magnetic thin film laminated structure may further include one or more additional layer deposited over the second layer structure. The additional layer structure may be the same as or different from the first layer structure or the second layer structure.

It should be understood that the above embodiments are merely exemplary embodiments to explain the principles of the disclosure, but the present disclosure is not limited thereto. Various modifications and improvements can be made by those skilled in the art without departing from the spirit and scope of the disclosure, and such modifications and improvements are also considered to be within the scope of the disclosure.

What is claimed is:

1. A magnetic thin film laminated structure comprising:

a first layer structure, wherein;

the first layer structure includes a first adhesive layer coupled to a workpiece by sputtering deposited process;

the adhesive layer comprises a material having compressive stress which is chosen from at least one of a Ta film, a TaN film, or a TiN film; and at least a first pair of layers coupled to the adhesive layer by sputtering deposited process, wherein the at least a first pair of layers comprises a magnetic film layer and an isolation layer, and a first additional magnetic film layer coupled to the at least a first pair of layers by sputtering deposited process; and a second layer structure, wherein:

the second layer structure coupled on the first layer structure by sputtering deposited process, wherein, the second layer structure comprises a second adhesive layer coupled on the first additional magnetic film layer by sputtering deposited process;

wherein the second adhesive layer comprises a material having compressive stress which is chosen from at least one of a Ta film, a TaN film, or a TiN film; and at least a second pair of layers coupled on the second adhesive layer by sputtering deposited process, each of the at least a second pair of layers comprises a magnetic film layer and an isolation layer, and a second additional magnetic film layer coupled on the at least a second pair of layers by sputtering deposited process.

2. The magnetic thin film laminated structure according to claim 1, wherein the magnetic film layer includes a material having soft magnetic properties.

3. The magnetic thin film laminated structure according to claim 2, wherein the material having soft magnetic properties comprises a NiFe permalloy material, a CoZrTa amorphous material, a Co-based material, a Fe-based material, or a Ni-based material.

4. The magnetic thin film laminated structure according to claim 1, wherein the isolation layer includes a non-magnetic material.

5. The magnetic thin film laminated structure according to claim 4, wherein the non-magnetic material comprises Cu, Ta, $SiO_2$ or $TiO_2$.

6. The magnetic thin film laminated structure according to claim 1, wherein a total thickness of the magnetic thin film laminated structure ranges from 400 nm to 3000 nm.

7. The magnetic thin film laminated structure according to claim 1, wherein:
the at least a first pair of layers includes two to fifty of pairs of the magnetic film layer and the isolation layer; and
the at least a second pair of layers includes two to fifty of pairs of the magnetic film layer and the isolation layer.

8. The magnetic thin film laminated structure according to claim 1, wherein:
a thickness of the first adhesive layer ranges from 3 to 50 nm; and
a thickness of the second adhesive layer ranges from 3 to 50 nm.

9. The magnetic thin film laminated structure according to claim 1, wherein:
the first adhesive layer has a thickness from 50 to 300 nm;
the second adhesive layer has a thickness from 50 to 300 nm;
the magnetic film layer has a thickness from 30 nm to 200 nm; and
the isolation layer has a thickness from 3 nm to 10 nm.

10. The magnetic thin film laminated structure according to claim 1, further comprising:
an additional layer structure coupled on the second layer structure, wherein the additional layer structure includes a structure same as one of the first and second layer structures.

11. A micro-inductive device comprising:
a magnetic core fabricated by a magnetic thin film laminated structure, the magnetic thin film laminated structure including:
a first layer structure, wherein:
the first layer structure includes a first adhesive layer coupled to a workpiece by sputtering deposited process;
the adhesive layer comprises a material having compressive stress which is chosen from at least one of a Ta film, a TaN film, or a TiN film; and
at least a first pair of layers coupled to the adhesive layer by sputtering deposited process, wherein the at least a first pair of layers comprises a magnetic film layer and an isolation layer, and a first additional magnetic film layer coupled on the at least a first pair of layers by sputtering deposited process; and
a second layer structure, wherein:
the second layer structure coupled on the first layer structure by sputtering deposited process, wherein the second layer structure comprises a second adhesive layer coupled on the first additional magnetic film layer by sputtering deposited process;
wherein the second adhesive layer includes a material having compressive stress which is chosen from at least one of a Ta film, a TaN film, or a TiN film; and
at least a second pair of layers coupled on the second adhesive layer by sputtering deposited process, each of the at least a second pair of layers comprises a magnetic film layer and an isolation layer, and a second additional magnetic film layer coupled on the at least a second pair of layers by sputtering deposited process;
wherein an application frequency of the micro-inductive device ranges from 100 MHz to 5 GHz.

12. The device according to claim 11, wherein the magnetic film layer includes a material having soft magnetic properties.

13. The device according to claim 12, wherein the material having soft magnetic properties comprises a NiFe permalloy material, a CoZrTa amorphous material, a Co-based material, a Fe-based material, or a Ni-based material.

14. The device according to claim 11, wherein the isolation layer includes a non-magnetic material.

15. The device according to claim 14, wherein the non-magnetic material comprises Cu, Ta, $SiO_2$ or $TiO_2$.

16. The device according to claim 11, wherein a total thickness of the magnetic thin film laminated structure ranges from 400 nm to 3000 nm.

17. The device according to claim 11, wherein:
the at least a first pair of layers includes two to fifty of pairs of the magnetic film layer and the isolation layer; and
the at least a second pair of layers includes two to fifty of pairs of the magnetic film layer and the isolation layer.

18. The device according to claim 11, wherein:
a thickness of the first adhesive layer ranges from 3 to 50 nm; and
a thickness of the second adhesive layer ranges from 3 to 50 nm.

19. The device according to claim 11, wherein:
the first adhesive layer has a thickness from 50 to 300 nm;
the second adhesive layer has a thickness from 50 to 300 nm;
the magnetic film layer has a thickness from 30 nm to 200 nm; and
the isolation layer has a thickness from 3 nm to 10 nm.

20. The device according to claim 11, wherein the magnetic thin film laminated structure further includes:
an additional layer structure coupled on the second layer structure, wherein the additional layer structure includes a structure same as one of the first and second layer structures.

* * * * *